United States Patent [19]

Ritola

[11] Patent Number: 4,945,976
[45] Date of Patent: Aug. 7, 1990

[54] LUGGED CHAIN BOARD LOADING APPARATUS

[75] Inventor: Edward Ritola, La Center, Wash.

[73] Assignee: Harvey Industries, Inc., Little Rock, Ark.

[21] Appl. No.: 267,396

[22] Filed: Nov. 4, 1988

[51] Int. Cl.⁵ ............................................. B65G 47/31
[52] U.S. Cl. .................................. 198/461; 198/463.4; 198/836.1
[58] Field of Search ............ 198/463.4, 836, 461, 198/462, 575, 576, 463.5, 475.1, 579

[56] References Cited

U.S. PATENT DOCUMENTS

| | | |
|---|---|---|
| 1,416,060 | 5/1922 | Price . |
| 2,679,919 | 6/1954 | DeKoning . |
| 3,186,332 | 6/1965 | Long et al. ............... 198/463.4 X |
| 3,314,524 | 4/1967 | Brandon . |
| 3,661,243 | 5/1972 | Piatek ..................... 198/475.1 |
| 3,721,330 | 3/1973 | Crawford et al. ............ 198/461 |
| 3,795,302 | 3/1974 | Schoppee . |
| 3,923,142 | 12/1975 | Rysti . |
| 3,978,971 | 9/1976 | Conrow et al. ............. 198/836 X |
| 4,077,524 | 3/1978 | Rysti ..................... 198/463.4 X |
| 4,228,888 | 10/1980 | Bruno .................... 198/461 |
| 4,296,660 | 10/1981 | Cristiani ................. 198/462 X |
| 4,325,477 | 4/1982 | Heikinhelmo ............. 198/463.4 X |

FOREIGN PATENT DOCUMENTS

| | | | |
|---|---|---|---|
| 2938010 | 4/1980 | Fed. Rep. of Germany ... | 198/463.4 |
| 1434430 | 5/1976 | United Kingdom ......... | 198/836 |

Primary Examiner—Robert J. Spar
Assistant Examiner—D. Glenn Dayoan
Attorney, Agent, or Firm—Kolisch, Hartwell & Dickinson

[57] ABSTRACT

High-speed, lugged chain board loading apparatus is described. The apparatus includes a generally horizontal feed conveyor that defines a planar board feed zone, a pick off conveyor having projecting lugs and including an upwardly inclined run that extends across the feed zone, a receiving conveyor for receiving each board at the upper end of the run and an arrester including an adjustably positionable eccentric that moves laterally spaced stop arms synchronously with the movement of the lugs along the inclined run. In the preferred embodiment, the pick off and receiving conveyors are driven at approximately twice the speed of the feed conveyor. The conveyors include endless link chains that travel in friction inhibiting races. In an intermediate position, the free ends of the stop arms extend rearward of the inclined run to hold off the sheet of boards supported by the feed conveyor. In a forward position, the stop arms' free ends extend forwardly of the run to permit the foremost board to picked off by the pick off conveyor. In a rearward position, which is selectable by actuation of a cylinder that normally biases the stop arms to follow the eccentric, the stop arms' free ends clear the projecting lugs of the pick off conveyor. Laterally spaced sheet stabilizers cooperate with the feed conveyor to ensure that boards within the feed zone are in a planar array as they approach the pick off conveyor. A transition zone of the pick off conveyor is provided in the vicinity of the receiving conveyor to ensure the smooth transfer of individual boards thereto for downstream processing by conventional board handling equipment.

5 Claims, 2 Drawing Sheets

LUGGED CHAIN BOARD LOADING APPARATUS

BACKGROUND OF THE INVENTION

This invention relates generally to board loading apparatus. More particularly, the invention concerns high-speed apparatus including a driven feed conveyor; an inclined pick off conveyor having projecting, board supporting lugs; a receiving conveyor for receiving each board; and an arrestor, including a stop arm, synchronized with the movement of the pick off conveyor alternately to hold back the sheet of boards on the feed conveyor and to permit one board at a time to be picked off. The apparatus provides accurate, reliable, high-speed board separation for individual board handling downstream.

Board handling equipment, which may include trimmers, planars, sorters and the like, require individual board separation from a planar sheet of transversely oriented, edge-abutted boards. Board separating, or loading, apparatus often limit the throughput of board handling systems due to the relative difficulty of accurately and reliably picking an individual board from a sheet of boards The problems associated with picking off an individual board include the undesirable displacement of the remaining boards of the sheet, and loss of control of the board picked off. These problems are exacerbated by operation of the board loading apparatus (heretofore limited to approximately one hundred boards/minute (bpm)) at the higher speeds of which other board handling equipment are capable.

It is desired to provide a significant increase in the rate at which board loading apparatus separates individual boards from a sheet of edge-abutted boards. It is important to provide such rate improvement without adversely impacting the accuracy or reliability of the board loading process. Finally, such improvement should be embodied in apparatus that is compatible with, thereby to significantly improve the throughput of, existing board handling systems.

SUMMARY OF THE INVENTION

Accordingly, it is a principal object of the present invention to provide board loading apparatus capable of achieving significantly increased board throughput.

Another object of the invention is to provide such apparatus without compromising board loading accuracy and reliability.

Yet another object is to provide apparatus that is compatible with present board handling equipment and systems.

A further object of the invention is to provide such apparatus cost-effectively.

The apparatus of the present invention may take the form of a stationary, frame-mounted apparatus which includes a generally horizontal, link chain feed conveyor for supporting the undersides of boards in a planar feed zone; and endless link chain pick off conveyor including an upwardly inclined run, which extends across the feed zone, the pick off conveyor having laterally spaced sets of horizontally aligned, projecting lugs, with board supporting surfaces, periodically spaced along the pick off conveyor, the surfaces when within the run being approximately horizontal and approximately parallel to the plane of the feed zone; a generally horizontal, feed dog-equipped, link chain receiving conveyor; an arrester including a stop arm for alternately holding back a sheet of boards on the feed conveyor and permitting the foremost board to be picked off by the pick off conveyor; and synchronization means synchronizing the operation of the arrester with upwardly inclined movement of the pick off conveyor.

In the preferred embodiment of the apparatus, the link chains of the conveyors are driven in friction inhibiting races by common drive means, with the pick off and receiving conveyors being driven at approximately twice the speed of the feed conveyor. A region of the upper end of the inclined run of the pick off conveyor defines a transition zone wherein the inclination of the run smoothly and steadily decreases to match that of the receiving conveyor. Three laterally spaced stop arms, the upper, free ends of which have a forward position underneath the run and an intermediate position above the run, are oscillated in timed relation with the pick off conveyor's movement by a position-adjustable eccentric, which the arms are pneumatically biased to follow. The pneumatic cylinder that normally biases the stop arms to follow the eccentric is selectively actuatable, under system control, to bias the arms away from the eccentric so that the arms' free ends are urged into a rearward position clear of the projecting lugs. Finally, laterally spaced overlying sheet stabilizers in the vicinity of the feed zone cooperate with the feed conveyor to maintain the boards in a single board-high sheet, or planar array.

In the operation of the apparatus of the invention, a planar sheet of edge-abutted boards, oriented transversely to the direction of their downstream travel on the feed conveyor, is driven thereby against the stop arms. While the boards within the sheets slide along the upper surface of the continuously driven feed conveyor, a set of projecting lugs within the upwardly inclined run of the pick off conveyor approaches the feed zone. Synchronously with the movement of the pick off conveyor, the eccentric causes the free ends of the stop arms to move from an intermediate, board stopping position above the run to a forward position underneath the run, thereby permitting the foremost board of the sheet to be advanced to a pick off position. As the approaching set of lugs picks up the foremost board, the arrester causes the free ends of the stop arms to return to the intermediate position, there (once again) to stop, or hold off, the advancing sheet of boards. The cycle is repeated indefinitely, unless interrupted by the system-controlled actuation of the arrester's pneumatic cylinder to bias the stop arms to a rearward position clear of the projecting lugs, as may be desired to interrupt or halt the board loading operation.

Thus, the objects of the invention are realized. Board loading rates in excess of two hundred bpm are achievable by use of the apparatus made in accordance with the preferred embodiment described herein. Cooperation of the feed conveyor and the sheet stabilizers maintains boards in a controllably planar array as they are advanced within the feed zone toward the pick off conveyor. Board loading is repeatably accurate, because the foremost board is picked off without abrupt change to its orientation within the feed zone and because it is accelerated forwardly and upwardly away from the next-in-line board, which remains relatively undisturbed. Provision of a transition zone in an upper region of the pick off conveyor's inclined run ensures the controlled transfer of individual, picked-off boards to the receiving conveyor for downstream processing. The apparatus is compatible with conventional board handling equipment, and may be cost-effectively installed and maintained.

These and other objects and advantages of the invention will become more fully apparent when the detailed description is read with reference to the accompanying drawings.

DETAILED DESCRIPTION OF THE PREFERRED EMBODIMENT

Figure 2:
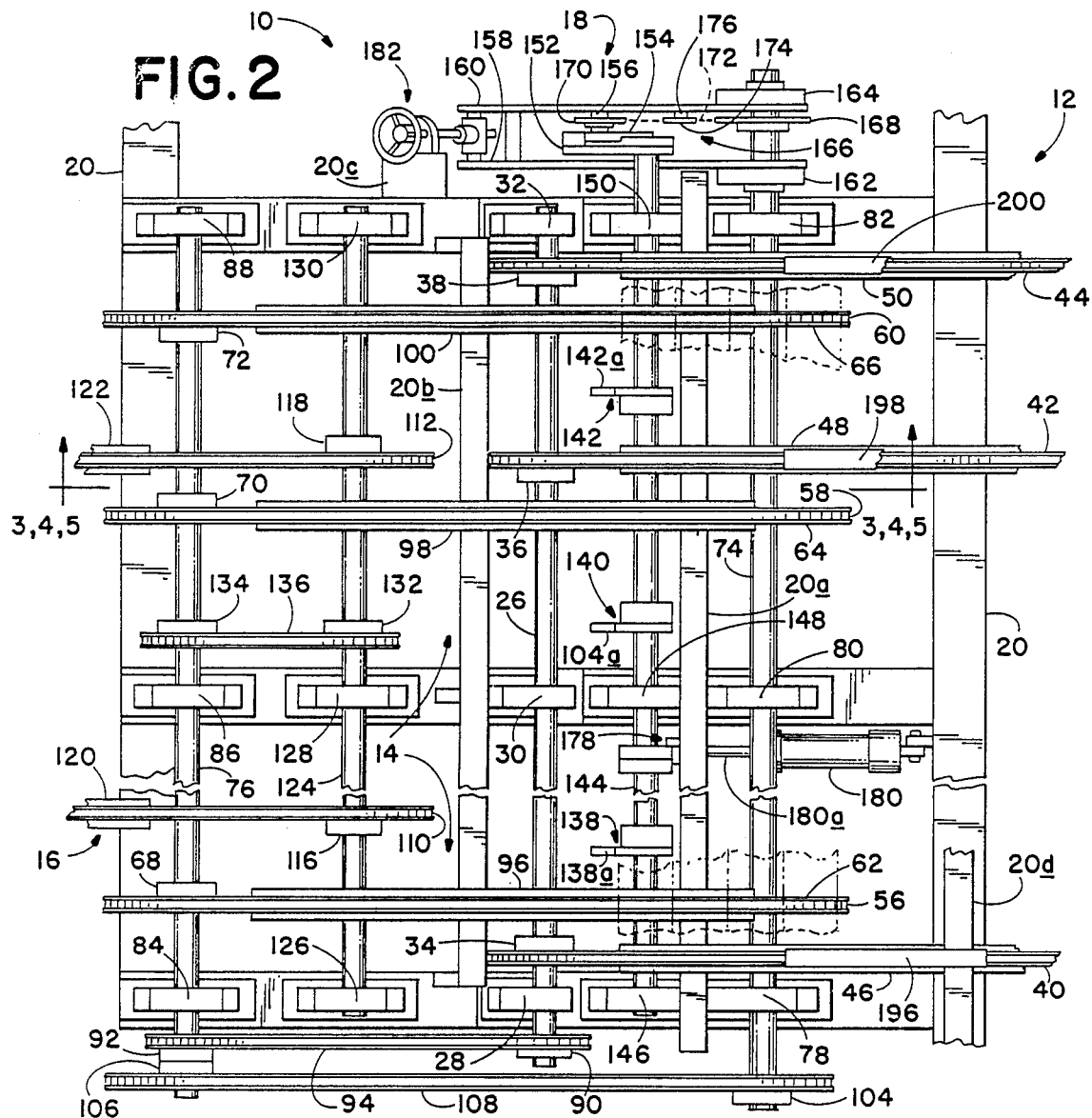
FIG. 2 is a top view of the apparatus corresponding to FIG. 1.
Figure 1:
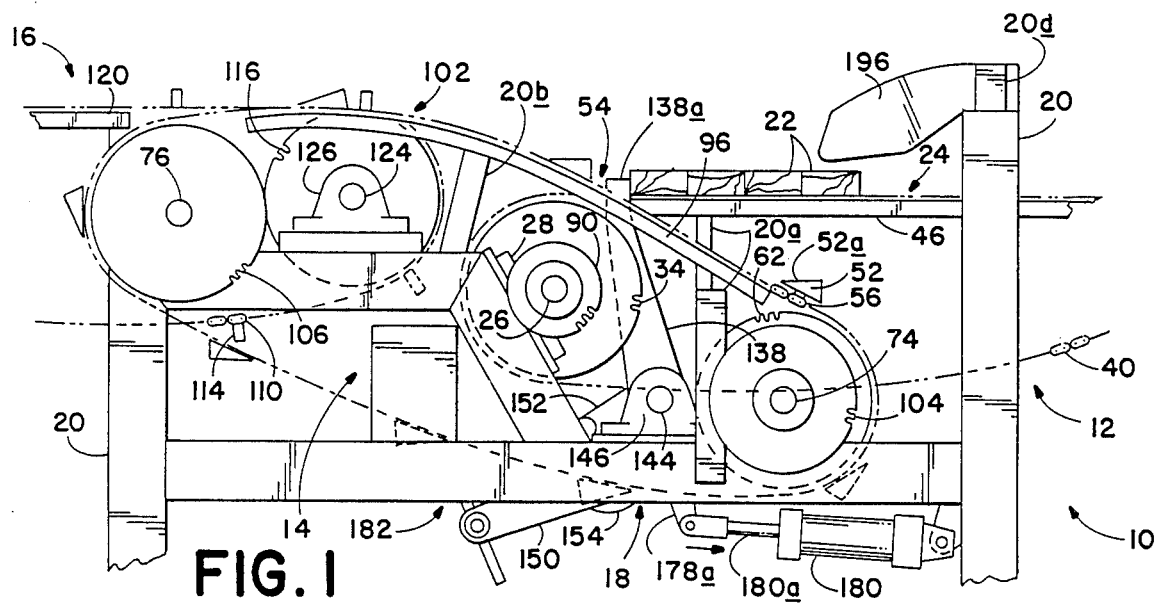
FIG. 1 is a side elevation of board loading apparatus made in accordance with the invention.

First it is noted that, throughout the illustration and description of the preferred embodiment of the invention, boards are advanced ('flow') in a direction from "upstream" to "downstream", or from right to left in FIGS. 1 through 5. Referring first to FIGS. 1 and 2, the apparatus of the invention in its preferred embodiment is indicated generally at 10. Apparatus 10 comprises a feed conveyor 12, a pick off conveyor 14, a receiving conveyor 16 and an arrester, indicated generally at 18. Conveyors 12, 14, 16 and arrester 18 are suitably mounted on a stationary frame 20.

Feed conveyor 12 is frame-mounted for supporting the undersides of boards, such as boards 22, in a generally planar feed zone, indicated generally at 24. Feed conveyor 12 includes a forward rotatable shaft 26 which is journal bearing-mounted, as by anti-friction bearing assemblies 28, 30, 32, on frame 20. Shaft 26 mounts laterally spaced, toothed sprockets 34, 36, 38. Laterally spaced link chains 40, 42, 44 extend around the sprockets as shown. Shaft 26 is driven, by conventional drive means common to that of pick off conveyor 14 and receiving conveyor 16, to advance boards 22 toward pick off conveyor 14. In the preferred embodiment of the invention, chains 40, 42, 44 travel (in a counterclockwise direction in FIG. 1) within friction inhibiting channels, or races, 46, 48, 50 along the path indicated by a dash-dot-dot line in FIG. 1. In the preferred embodiment, the chain supporting surfaces of races 46, 48, 50 are suitably prepared, as by affixing thereon a Teflon ® layer or coating, to permit the smoothly controlled travel of chains 36, 38, 40 therein. A first race support 20a, which extends upwardly and laterally inwardly from either side of frame 20, rigidly mounts the downstream ends of races 46, 48, 50.

It will be understood that feed conveyor 12 may be sightly downwardly inclined to provide feed conveyor 12 with the same starting elevation (on its right side in FIG. 1) as that of receiving conveyor 16. It also will be understood that feed conveyor 12 may be dimensioned to be of any desired longitudinal (upstream) extent. Thus, apparatus 10 may be made to be compatible with existing board handling systems, and may be readily retrofitted to replace the conventional, low-speed board loading apparatus of existing installations.

Pick off conveyor 14, which is mounted on frame 20, has plural sets of laterally spaced, horizontally aligned projecting lugs, such as lugs 52, mounted thereon and distributed evenly therealong. An upwardly inclined run of pick off conveyor 14, indicated generally at 54 and best shown in FIG. 1, extends across feed zone 24 of feed conveyor 12. In the preferred embodiment, run 54 has a planar extent in the region of feed zone 24 the inclination (from the horizontal) of which is between approximately thirty and sixty degrees. Pick off conveyor 14 includes laterally spaced linked chains 56, 58, 60 mounting horizontally aligned sets of lugs 52, with the mounting of each lug spanning only one link of the chain which mounts it. Lugs 52 have board supporting surfaces, such as surface 52a, which are approximately parallel with planar feed zone 24 as they move along upwardly inclined run 54. Chains 56, 58, 60 extend endlessly around corresponding pairs of sprockets 62, 64, 66, 68, 70, 72, which are mounted (three each) on one of two rotatable shafts 74, 76. It is noted that sprockets 62, 64, 66 are mounted, for rotation relative to shaft 74, on anti-friction bearings (such as bearing 66a not shown in FIGS. 1 and 2, but shown in FIGS. 3 through 5), whereas sprockets 68, 70, 72 are fixedly mounted to shaft 76 for rotation therewith, thereby ensuring uniform tension in lugged chains 56, 58, 60. Shafts 74, 76, are suitably journal bearing-mounted on frame 20, as by anti-friction bearing assemblies 78, 80, 82, 84, 86, 88.

Shaft 76 is rotated by drive means common with that of shaft 26 in such manner that chains 56, 58, 60 travel (in a counterclockwise direction in FIG. 1) along the path indicated by a dash-dot-dot line in FIG. 1. In the preferred embodiment, the drive linkage includes sprockets 90, 92, which are mounted for rotation with shafts 26, 76, respectively, and a link chain 94 (refer to FIG. 2). It will be understood that the ratio between the diameters (the number of teeth) of sprockets 90, 92 determines the ratio between the speeds of feed conveyor 12 and pick off conveyor 14, which speed ratio is approximately 1:2 in the preferred embodiment of the invention. Chains 56, 58, 60 travel, along an upper portion of their paths, within friction inhibiting races 96, 98, 100. First race support 20a rigidly mounts the upstream ends of races 96, 98, 100, while a second race support 20b rigidly mounts their downstream ends to frame 20. Races 96, 98, 100 describe a large radius arc along their upper (downstream) extent, as best shown in FIG. 1, thus defining a transition zone 102 in the region of the upper end of upwardly inclined run 54. Within transition zone 102, the inclination of run 54 smoothly and steadily decreases to match that of receiving conveyor 16, thereby ensuring the smooth and stable transfer of individual ones of boards 22 from lugs 52 onto receiving conveyor 16.

Sprockets 104, 106, which are rigidly mounted on extreme ends of shafts 74, 76, respectively, are connected by a link chain 108. This set of sprockets and chain provides the drive linkage between shafts 74, 76 of pick off conveyor 14. Those skilled in the art will understand that it is chain 108 which is used to provide the drive linkage for pick off conveyor 14, rather than lugged chains 56, 58, 60, the latter of which must be precisely tensioned for conformity with one another to ensure proper horizontal alignment of sets of lugs 52.

Receiving conveyor 16 fragmentarily is shown extending downstream from, and at the elevation of, the upper extent of transition zone 102. Laterally spaced link chains 110, 112 preferably are equipped with feed dogs, such as feed dog 114, which are spaced therealong at a desired interval. Chains 110, 112 extend around, and are driven (in a counterclockwise direction in FIG. 1) by, corresponding, laterally spaced sprockets 116, 118. Chains 110, 112 travel, along a generally planar, upper extent of their path indicated in FIG. 1 by a dash-dot-dot line, within friction inhibiting races 120, 122. Sprockets 116, 118 are anti-friction bearing-mounted for rotation with a rotatable drive shaft 124 (driven by conventional means not shown), which is journal bearing-mounted, as by anti-friction bearing assemblies 126, 128, 130, on frame 20. Shaft 124 is driven by drive means common to feed conveyor 12 and pick off conveyor 14. In the preferred embodiment, the drive linkage includes sprockets 132, 134, which are mounted for rotation with shafts 124, 76, respectively, and which are connected by a link chain 136.

It will be appreciated that the elevation of receiving conveyor 16 is preferably equal to that of the upper extent of transition zone 102, thereby ensuring the smooth transfer of individual ones of boards 22 therebetween. It also will be appreciated that, in the preferred embodiment, receiving conveyor 16 is driven at the same speed as is pick off conveyor 14. Of course, receiving conveyor 16 may be driven at a greater speed, depending upon feed dog spacing and board handling system requirements.

Referring still to FIGS. 1 and 2, arrester 18 and synchronization means synchronizing its operation with the movement of pick off conveyor 14 now will be described. Arrester 18 includes laterally spaced, upright stop arms 138, 140, 142 that are rigidly mounted to, and pivotable with, a rotatable, stop arm carrying shaft 144. Shaft 144 is journal bearing-mounted by anti-friction bearing assemblies 146, 148, 150 on frame 20. A cam follower 152, which is rigidly mounted to and pivotable with shaft 144, is made to follow a cam, or rotatable eccentric 154, thereby imparting pivotal motion to stop arms 138, 140, 142. The free ends 138a, 140a, 142a of stop arms 138, 140, 142 have an intermediate position above inclined run 54, as shown in FIG. 1, for arresting the advancement of the foremost one of boards 22 by feed conveyor 12 toward pick off conveyor 14. It will be appreciated by those skilled in the art, that, within the spirit of the invention, any suitable number of laterally spaced stop arms may be used.

Eccentric 154 is mounted for rotation with a shaft 156 which is suitably anti-friction bearing-mounted on, and extends between, dual, laterally spaced carriage arms 158, 160. Carriage arms 158, 160 are freely mounted on, for rotation therewithin of, an extreme end of rearward pick off conveyor shaft 74 by anti-friction bearing assemblies 162, 164. Synchronization means indicated generally at 166, which synchronize the operation of arrester 18 with movement of inclined run 54, includes sprockets 168, 170 mounted for rotation, respectively, with shafts 74, 156 and connected by a cam drive link chain 172. A position-adjustable idler sprocket 174 is provided, in the preferred embodiment, operatively to engage chain 172 as shown between sprockets 168, 170. Idler sprocket 174 is mounted for rotation on a shaft 176 the position of which may be adjusted to the extent of a vertically slotted hole formed in carriage arm 160, thereby to permit adjustment of the tension in chain 172.

Near the center of stop arm carrying shaft 144 is a rigidly mounted, depending control arm 178 a free end 178a of which is rotatably mounted to the rod 180a of pneumatic means, or a double-action, pneumatic cylinder 180 mounted on frame 20. Pneumatic cylinder 180 is normally actuated, with rod 180a urged in the direction indicated by an arrow in FIG. 1, to bias follower 152 and, in turn, stop arms 138, 140, 142 to follow eccentric 154. Thus, the intermediate position of stop arm free ends 138a, 140a, 142a (best seen by reference to FIG. 1) is controlled through oscillation of stop arms 138, 140, 142 (via shaft 144 and follower 152) by rotating eccentric 154 in timed relation (via synchronization means 166) with the upwardly inclined movement of pick off conveyor 14.

Those skilled in the art will understand that the 'gear' (diameter or number of teeth) ratio among sprockets 104, 106, 168, 170 defines the rate of angular rotation of eccentric 154 relative to the rate at which lugged chains 56, 58, 60 are advanced along pick off conveyor 14. Thus, this ratio establishes the necessary synchronization between the cyclic pivoting of stop arms 138, 140, 142 and the approach of successive sets of lugs 152 toward foremost board 22. As eccentric 154 must complete one rotation in the time it takes for a set of lugs 52 to advance the distance by which adjacent sets are spaced apart on chains 56, 58, 60, this ratio must be n:1, where n is the number of lug sets distributed along pick off conveyor 14. It may be seen from FIG. 1 that, in the illustrated embodiment of the invention, n = 8.

In the preferred embodiment of the invention, arrester 18 can be adjusted to change the position of shaft 156, which mounts eccentric 154. This is made possible by the use of bearing assemblies 162, 164 to mount carriage arms 158, 160 (and thus eccentric 154, which they mount), which are pivotable about the axis of pick off conveyor shaft 74. By the provision of shaft adjustment means, or a vernier control 182 (mounted on frame 20 by a vernier control support 20c) to pivot carriage arms 158, 160, it is possible to adjust the position of eccentric 154 relative to stop arm shaft 144, thereby to change the intermediate position of the upper free ends of stop arms 138, 140, 142. This adjustability is helpful in accommodating various sizes of boards 22, and in calibrating apparatus 10 for optimal performance in automatic board loading.

Figure 3:
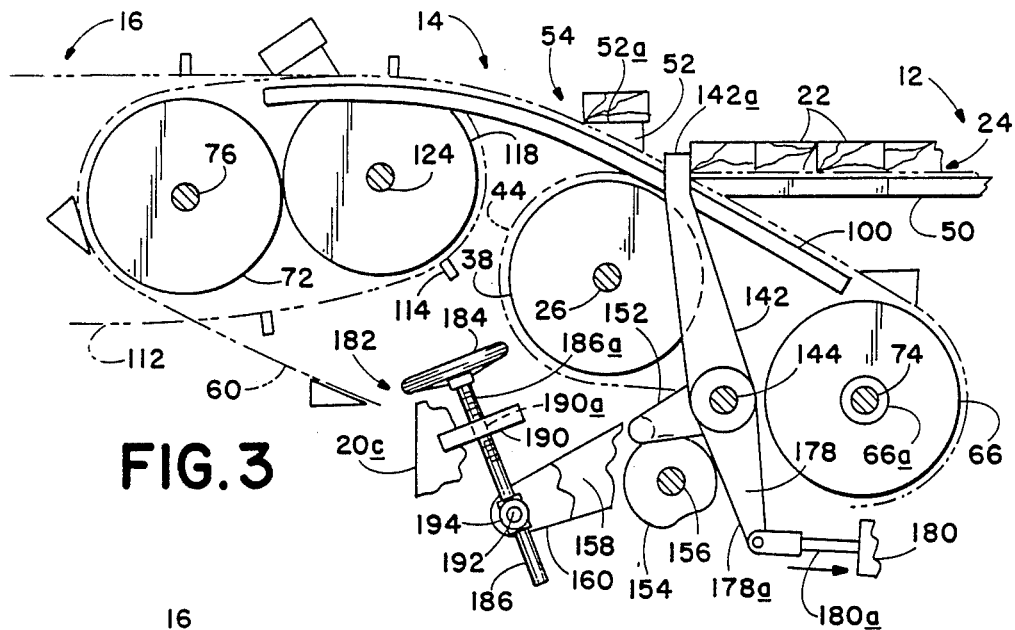
FIG. 3 is an enlarged, fragmentary side elevation, taken generally along the line 3—3 of FIG. 2, showing the board hold off phase of the operation of the apparatus and showing, in cutaway detail, means for adjustably positioning the eccentric.
Figure 4:
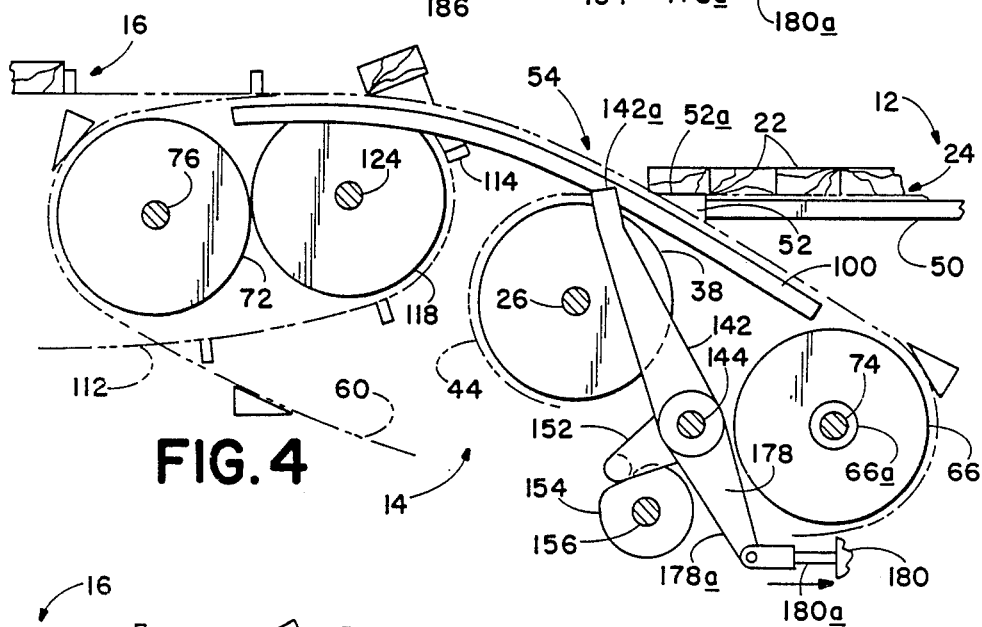
FIG. 4 is a fragmentary side elevation corresponding generally to that of FIG. 3, but showing the apparatus in the board pick off phase of its operation.
Figure 5:
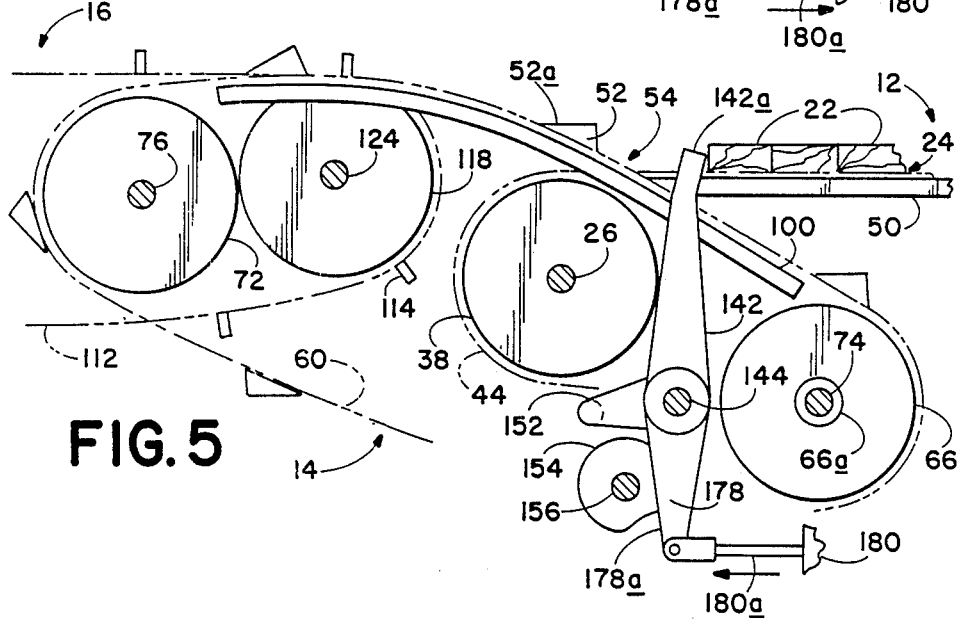
FIG. 5 is a fragmentary side elevation corresponding generally to that of FIG. 3, but showing the apparatus in a board flow interrupt phase of its operation.

FIGS. 3 through 5 illustrate the operation of apparatus 10, in a series of fragmentary, cross-sectional side views taken generally along the line 3,4,5-3,4,5 of FIG. 2. FIG. 3 is similar to FIG. 1 in that it shows stop arm 142 (which corresponds with stop arm 138 in FIG. 1) in its intermediate position above inclined run 154. Eccentric run 154 is rotated into a position of the greatest radial extent of its irregularly contoured, operative surface, thus urging follower 152 into its uppermost position relative to stop arm shaft 144. In the resulting pivotable position of stop arm 142, free end 142a is in an intermediate position holding the foremost one of boards 42 (by impingement of the stop arms' free ends against the leading edge of the foremost board) back against its advancement by feed conveyor 12 toward pick off conveyor 14. While feed conveyor 12 is continuously advanced, boards 22 are permitted to slide along the upper surfaces of chains 40, 42, 44. During the cyclically pivotal operation of stop arms 138, 140, 142, cylinder 180 provides a static force (in the direction shown by an arrow) on rod 180a to urge follower 152 into close and continuous contact with the operative surface of eccentric 154. The position and orientation of arrester 18 and its associated synchronization means 166 shown in FIG. 3 represent a point in time immediately after a set of lugs 52 has picked off the preceding one of boards 22, which board is advanced by pick off conveyor 14 of inclined run 54 toward receiving conveyor 16.

FIG. 3 shows the structure of vernier control 182 in further detail. Vernier control 182 includes a wheel 184 rigidly connected to a rod 186 having a threaded region 186a. Threaded region 186a is threadedly received in a threaded bore 190a formed in a plate 190 that is rigidly mounted to vernier control support 20c (shown fragmentarily). Extending between carriage arms 158, 160 is a fixed shaft 192 having rotatably mounted thereon a collar 194, which is secured to the free end of rod 186. Rotation of wheel 184 results in the pivoting of carriage arms 158, 160. Thus, the position of shaft 156, which rotatably mounts eccentric 154, relative to cam follower 152 is adjustable to change the position of the arc through which stop arms 138, 140, 142 are pivoted, thereby permitting the operator to change the forward and intermediate positions of the stop arms' free ends 138a, 140a, 142a. This feature has particular utility in calibrating apparatus 10 for optimal performance with a given, nominal board size and mass.

FIG. 4 shows operation of the arrester and its associated synchronization means 166 at a momentarily later time than that illustrated in FIG. 3. With eccentric 154 in a rotational position of the least radial extent of its operative surface, follower 152 is urged by cylinder 180 to a slightly lower elevation, resulting in the pivoting of the free end 142a of stop arm 142 to a forward position underneath run 54 (to the left in FIG. 4). As stop arm 142 reaches this extreme position, the synchronized operation of pick off conveyor 14 causes an approaching set of lugs 52 to arrive at the level of feed zone 24. Importantly, lug supporting surfaces 52a are approximately parallel with planar feed zone 24, within inclined run 54 of pick off conveyor 14. This is so that, at the moment of pick off of foremost board 22, its bottom face substantially mates supporting surfaces 52a thus minimizing the tendency of the board to be impacted in a way that would cause it to tumble or otherwise be destabilized. As described above, pick off conveyor 14 is operated at approximately twice the speed of feed conveyor 12 so that the foremost board 22 is abruptly accelerated as it is picked off. By overcoming the inertial and frictional forces that act upon foremost board 22, this acceleration produces a desirably crisp disengagement of the foremost board from the next-in-line board within feed zone 24.

In FIG. 5, a special feature of the invention is illustrated. Double-action cylinder 180 is shown with its rod 180a being urged (in the direction shown by an arrow) into an extended position. Selectively actuating cylinder 180 to extend rod 180a biases stop arm 142 (and corresponding, laterally spaced stop arms 138, 140) away from eccentric 154 so that upper free end 142a of stop arm 142 is urged into a rearward position clear of projecting lugs 52. As may be seen, pick off conveyor 14 continues to advance lugs 52 along inclined run 54 and across feed zone 24. But boards 22 are prevented from being picked off thereby. This feature of the preferred embodiment of apparatus 10 is particularly useful in fully automated board handling systems to interrupt, upon command from a system controller, the flow of boards, e.g. to limit throughput, to increase spacing between boards or to prevent jamming of less capable downstream equipment.

Referring again to FIGS. 1 and 2, another feature of the invention in its preferred embodiment will be described. It may be seen that three laterally spaced, overlying sheet stabilizers 196, 198, 200 are provide in the vicinity of feed zone 24. The stabilizers cooperate with feed conveyor 12 to maintain boards 22 in a planar array, by providing a vertically constricted passage way through which only a single board may pass. The stabilizers are mounted to a transverse member 20d (shown fragmentarily in FIGS. 1 and 2). Preferably, they are mounted in such manner that their height above feed zone 24 can be readily adjusted to accommodate various board sizes, e.g. one by fours as well as two by fours. Finally, in the preferred embodiment of the invention, stabilizers 196, 198, 200 are mounted directly above corresponding feed conveyor races 46, 48, 50. Thus, the sheet stabilizers of the present invention cooperate with the feed conveyor in apparatus 10 to maintain the boards in a planar array.

It will be understood that the laterally spaced chains of the various conveyors of apparatus 10 are spaced at uneven intervals to accommodate various lengths of boards. For example, a board of nominal six foot length will be supported in feed zone 24 by chains 40, 42, while a board of nominal eight foot length will be supported by chains 40, 42, 44. Similarly, a board of nominal six foot length will be supported with inclined run 54 by chains 56, 58, while a board of nominal eight foot length will be supported by chains 56, 58, 60. It will be appreciated that, within the spirit of the invention, alternate numbers or spacings of chains within the various conveyors may be used. It will also be appreciated that the conveyors need not include link chains, but rather may include belts or other means of conveying boards and, in the case of the pick off conveyor, of carrying projecting lugs.

The advantages of the apparatus of the invention over prior art apparatus are manifest. Capable of achieving twice the throughput of conventional board loading equipment, the apparatus of the invention yet is compatible with existing board handling equipment and easily and cost effectively may be retrofitted into slower systems, thereby to increase their throughput. The lugged chain board loading apparatus described herein provides fully automatic and repeatably accurate separation, for individual board handling downstream, of consecutive boards from a planar feed zone by abruptly accelerating the foremost one of the boards upwardly and forwardly away from an edge-abutted, next-in-line board and then by providing a smooth transition between the inclined pick off conveyor run and a downstream, typically horizontal receiving conveyor. The difficulties of maintaining control of individual boards, while operating board loading apparatus at high speed, are thus surmounted.

Accordingly, while a preferred embodiment of the invention has been described herein, it is appreciated that further modifications are possible that come within the scope of the invention.

It is claimed and desired to secure by Letters Patent:
1. High-speed board loading apparatus, comprising:
   a substantially horizontal feed conveyor for supporting the undersides of boards in a planar feed zone, said feed conveyor being powered by drive means to move at a given speed and to advance the boards in a downstream direction;

an endless pick off conveyor having projecting lugs mounted thereon and distributed along the conveyor, said lugs having board supporting surfaces, said pick off conveyor having an upwardly inclined run extending across said feed zone, with the surfaces of said lugs within said run being approximately parallel with the plane of said feed zone the pick off conveyor being power driven at a speed such that the horizontal component of the travel speed of said inclined run exceeds said given speed;

a receiving conveyor for receiving each board at the upper end of said run; and an arrester and means synchronizing the operation of said arrester with upwardly inclined movement of said pick off conveyor to permit the board foremost on said feed conveyor to be loaded onto said receiving conveyor.

2. High-speed board loading apparatus comprising:

a feed conveyor for supporting the undersides of boards in a planar feed zone, said feed conveyor being powered by drive means to advance the boards in a downstream direction;

an endless pick off conveyor having projecting lugs mounted thereon and distributed along the conveyor, said lugs having boards supporting surfaces, said pick off conveyor having an upwardly inclined run extending across said feed zone, with the surfaces of said lugs within said run being approximately parallel with a plane of said feed zone;

a receiving conveyor for receiving each board at the upper end of said run; and an arrester and means synchronizing the operation of said arrester with upwardly inclined movement of said pick off conveyor to permit the board foremost on said feed conveyor to be loaded onto said receiving conveyor;

said arrester including an upright arm with an upper free end having a forward position underneath said run and an intermediate position above said run, the means synchronizing the operation of the arrester with movement of the pick off conveyor including an eccentric which oscillates said arm in timed relation with movement of the pick off conveyor;

the means synchronizing operation of the arrester further including pneumatic means biasing said arm to urge the arm against the eccentric, said pneumatic means being selectively actuatable to move the arm away from the eccentric with the arm moving to a non-oscillated position where said upper free end of the arm is in a rearward position clear of said projecting lugs.

3. The apparatus of claim 2, further comprising an overlying sheet stabilizer in the vicinity of said feed zone, said stabilizer cooperating with said feed conveyor to maintain the boards in a planar array.

4. The apparatus of claim 2, wherein said eccentric is mounted on a shaft for rotation and wherein the position of said shaft is adjustable by shaft adjustment means to change said forward position and said intermediate position of the upper free end of said arm.

5. High-speed board loading apparatus comprising:

a feed conveyor and powered means for driving the feed conveyor to advance boards in a downstream direction and toward a forward end of the conveyor, the feed conveyor adjacent said forward end supporting the undersides of boards in a substantially planar feed zone;

an endless pick off conveyor having projecting lugs mounted thereon and distributed along the conveyor, said lugs having board supporting surfaces, said pick off conveyor having an upwardly inclined run extending across the forward end of the feed conveyor with the surfaces of said lugs within said run being approximately parallel with the plane of said feed zone;

a receiving conveyor disposed forwardly of the pick off conveyor for receiving each board arriving at the upper end of the said run; and arrester means controlling movement of boars off the forward end of the feed conveyor and onto said pick off conveyor;

said arrester means including an upright arrester arm and said arm having an upper free end, an eccentric operable to oscillate the arm in timed relation with movement of the pick off conveyor, and pneumatic means urging said arm against said eccentric, the eccentric producing movement of the arm between forward position where said upper free end of the arm is disposed forwardly and under said run and intermediate position where said upper free end is above said run, said pneumatic means being selectively actuatable to shift the arm away from said eccentric to place its said upper free end rearwardly from said intermediate position and in a position stopping movement of boards in said feed zone.

* * * * *